(12) United States Patent
Teufl et al.

(10) Patent No.: US 12,719,050 B2
(45) Date of Patent: Aug. 25, 2026

(54) CATHODE ACTIVE MATERIAL, METHOD FOR ITS MANUFACTURE, AND USE

(71) Applicants: BASF SE, Ludwigshafen am Rhein (DE); THE BOARD OF TRUSTEES OF THE LELAND STANFORD JUNIOR UNIVERSITY, Stanford, CA (US)

(72) Inventors: Tobias Maximilian Teufl, Poing (DE); Jordan K Lampert, Pensacola, FL (US); Heino Sommer, Eggenstein-Leopoldshafen (DE); William C. Chueh, Stanford, CA (US); William E. Gent, Stanford, CA (US)

( * ) Notice: Subject to any disclaimer, the term of this patent is extended or adjusted under 35 U.S.C. 154(b) by 616 days.

(21) Appl. No.: 18/036,828

(22) PCT Filed: Nov. 5, 2021

(86) PCT No.: PCT/EP2021/080785
§ 371 (c)(1),
(2) Date: May 12, 2023

(87) PCT Pub. No.: WO2022/101103
PCT Pub. Date: May 19, 2022

(65) Prior Publication Data

US 2024/0006601 A1 Jan. 4, 2024

(30) Foreign Application Priority Data

Nov. 13, 2020 (EP) .................................... 20207655

(51) Int. Cl.
*H01M 4/505* (2010.01)
*C01G 53/56* (2025.01)
(Continued)

(52) U.S. Cl.
CPC ............ *H01M 4/505* (2013.01); *C01G 53/56* (2013.01); *H01M 4/131* (2013.01); *H01M 4/525* (2013.01);
(Continued)

(58) Field of Classification Search
None
See application file for complete search history.

(56) References Cited

U.S. PATENT DOCUMENTS 10,135,064 B2 * 11/2018 Kawasato .............. B82Y 30/00
10,326,127 B2 * 6/2019 Kawasato ............ H01M 4/525
(Continued)

FOREIGN PATENT DOCUMENTS

CN 111477867 A 7/2020

OTHER PUBLICATIONS

Extended European Search Report dated May 3, 2021, of counterpart European Patent Application No. 20207655.0.

*Primary Examiner* — John J Figueroa
(74) *Attorney, Agent, or Firm* — Armstrong Teasdale LLP

(57) ABSTRACT

Process for making a composite oxide according to the formula $x \cdot Li_2Ni_{1-y1-y2}Mn_{y1}M^1_{y2}O_3 \cdot (1-x) \cdot LiNi_{1-z}M^2_zO_2$ wherein x is in the range of from 0.01 to 0.5, z is in the range of from zero to 0.5, $M^1$ is selected from Ti, Zr, Sn, Ge, Ta, Nb, Sb, W, and Mo, and combinations of at least two of the foregoing, $M^2$ is at least one of Co, Al, Mg, Fe, or Mn, or a combination of at least two of the foregoing, $0.1 \le y1 \le 0.75$, zero$\le y2 \le 0.05$, said process comprising the following steps:

(a) providing a particulate hydroxide, oxide or oxyhydroxide of TM where TM has the general formula $x \cdot Ni_{1-y1-y2}Mn_{y1}M^1_{y} \cdot (1-x)Ni_{1-z}M^2_z$, or the respective species without $M^1$ and/or $M^2$, (Continued)

(b) adding a source of lithium,
(c) treating the mixture obtained from step (b) thermally under an atmosphere comprising oxygen in two steps:
(c) heating the mixture obtained from step (b) to 680 to 800° C. in an atmosphere containing in the range of from 10 to 100 vol-% oxygen, and,
(e) heating the intermediate from step (c) to 450 to 580° C. in an atmosphere containing at least 90 vol-% oxygen.

12 Claims, 2 Drawing Sheets

(51) Int. Cl.
*H01M 4/02* (2006.01)
*H01M 4/131* (2010.01)
*H01M 4/525* (2010.01)

(52) U.S. Cl.
CPC ...... *C01P 2002/72* (2013.01); *C01P 2004/84* (2013.01); *C01P 2006/40* (2013.01); *H01M 2004/028* (2013.01)

(56) References Cited

U.S. PATENT DOCUMENTS

| | | | | |
|---|---|---|---|---|
| 12,288,876 | B2 * | 4/2025 | Fukui | H01M 4/505 |
| 2002/0110518 | A1 | 8/2002 | Okuda et al. | |
| 2003/0087154 | A1 | 5/2003 | Ohzuku et al. | |
| 2015/0364761 | A1 * | 12/2015 | Fukui | H01M 4/505<br>429/223 |
| 2020/0274159 | A1 * | 8/2020 | Lampert | C01G 53/82 |
| 2021/0075014 | A1 * | 3/2021 | Kim | H01M 4/0471 |
| 2021/0098782 | A1 * | 4/2021 | Mendez Agudelo | H01M 4/366 |

* cited by examiner

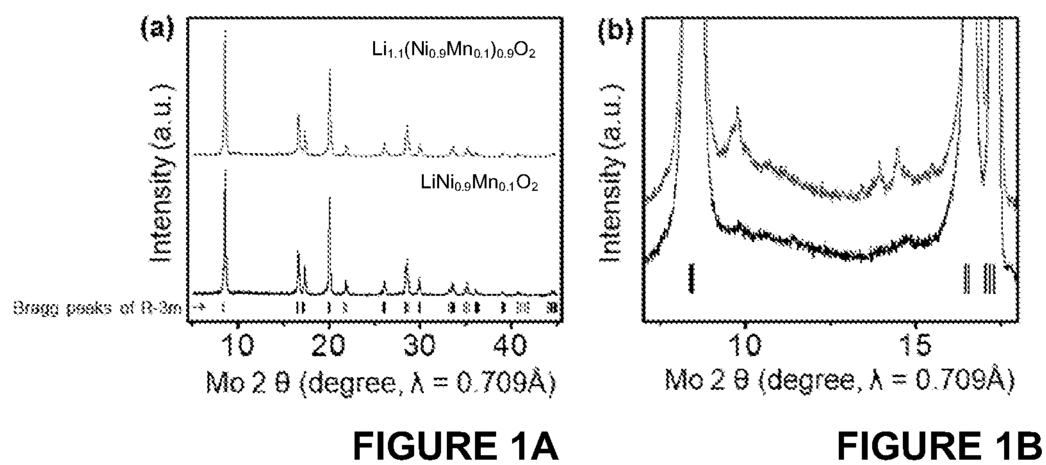
FIGURE 1A
FIGURE 1B
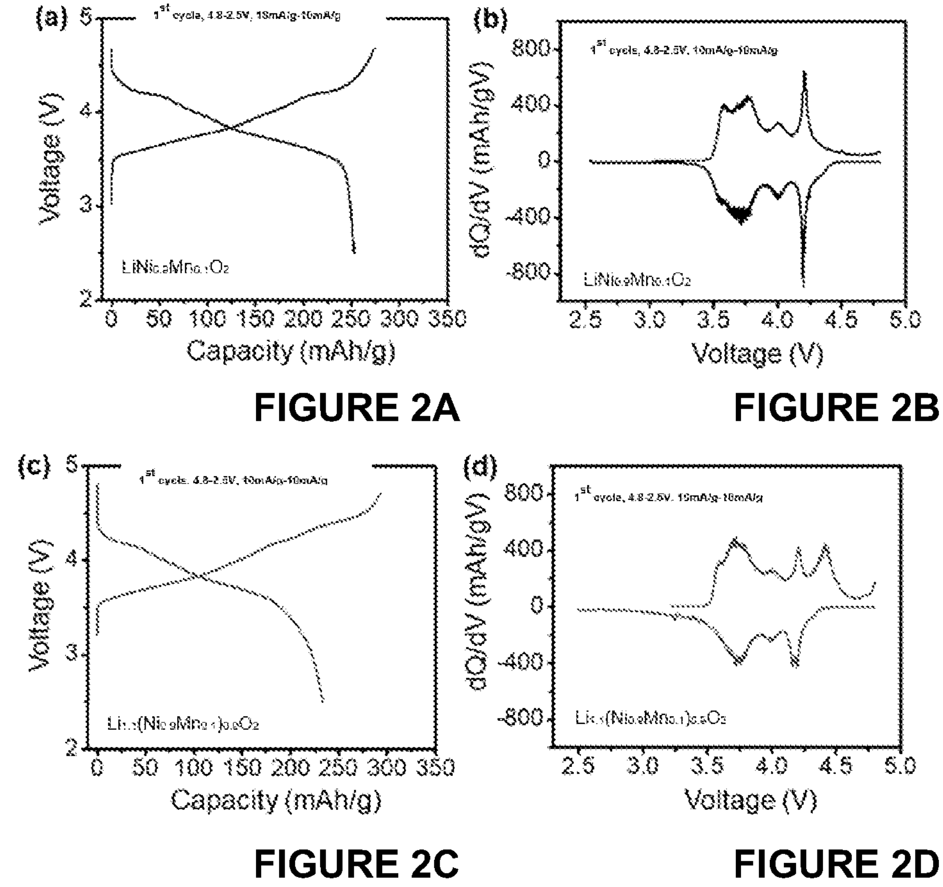
FIGURE 2A
FIGURE 2B
FIGURE 2C
FIGURE 2D

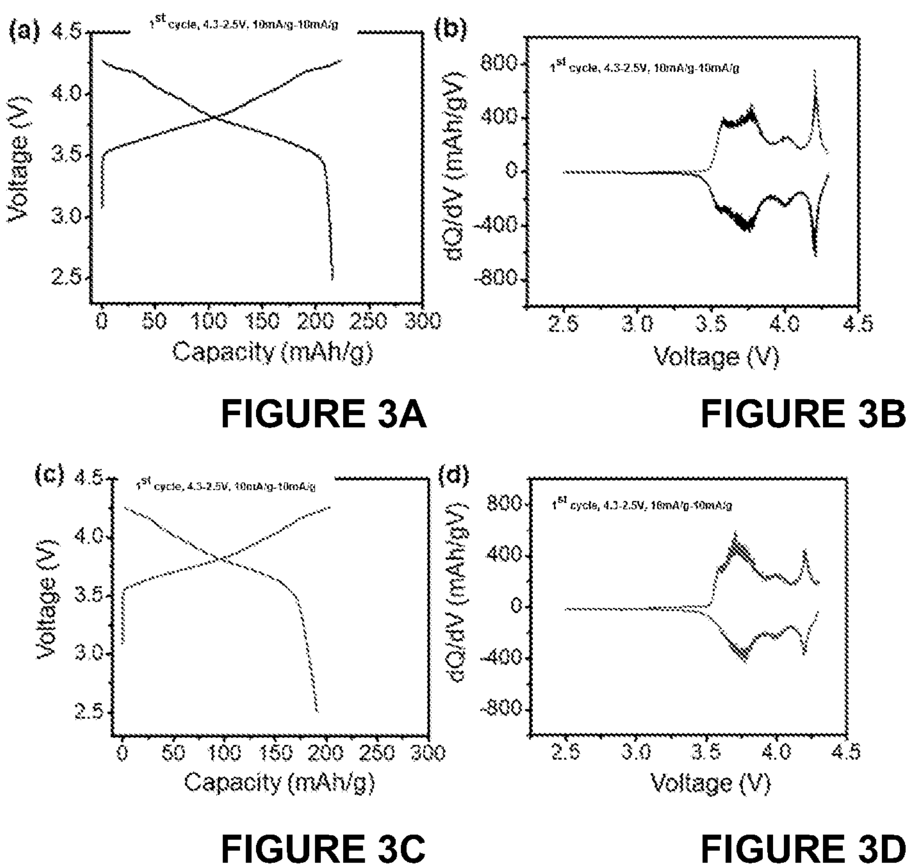
FIGURE 3A FIGURE 3B
FIGURE 3C FIGURE 3D
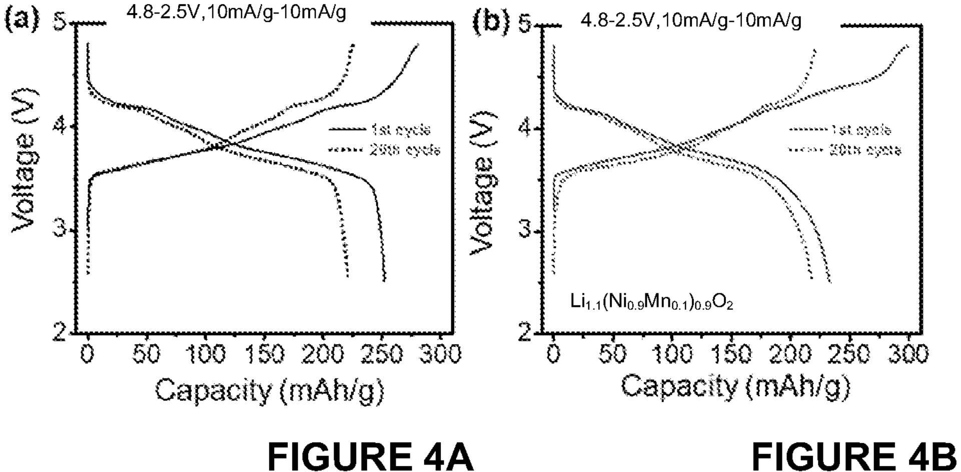
FIGURE 4A FIGURE 4B

CATHODE ACTIVE MATERIAL, METHOD FOR ITS MANUFACTURE, AND USE

The present invention is directed towards a process for making a composite oxide according to the formula $x \cdot Li_2Ni_{1-y1-y2}Mn_{y1}M^1_{y2}O_3 \cdot (1-x) \cdot LiNi_{1-z}M^2_zO_2$ wherein x is in the range of from 0.01 to 0.5, z is in the range of from zero to 0.5, preferably 0.01 to 0.4 and more preferably from 0.01 to 0.1, $M^1$ is selected from Ti, Zr, Sn, Ge, Ta, Nb, Sb, W, and Mo, and combinations of at least two of the foregoing, $M^2$ is selected from Na, K, Co, Al, Mg, Fe, and Mn, and from combinations of at least two of the foregoing, preferred are Co, Al, Mg, Fe, and Mn, and combinations of at least two of the foregoing, $0.1 \le y1 \le 0.75$, and $zero \le y2 \le 0.05$, said process comprising the following steps:

(a) providing a particulate hydroxide, oxide or oxyhydroxide of TM where TM has the general formula $x \cdot Ni_{1-y1-y2}Mn_{y1}M^1_{y2} \cdot (1-x)M^2$, or a corresponding species without $M^1$ and/or $M^2$, (b) adding a source of lithium and, optionally, a source of $M^1$ and/or $M^2$, in a molar ratio of Li:(Ni+Mn+$M^1$+$M^2$) of from 0.9:1 to 1.1:1, (c) heating the mixture obtained from step (b) to 680 to 800° C. in an atmosphere containing oxygen, (d) adding source of lithium, and (e) heating the mixture obtained from step (d) to 450 to 580° C. in an atmosphere containing at least 90 vol-% oxygen.

The present invention is further directed towards electrode active materials and to their use.

Lithiated transition metal oxides are currently being used as electrode active materials for lithium-ion batteries. Extensive research and developmental work have been performed in the past years to improve properties like charge density, specific energy, but also other properties like the reduced cycle life and capacity loss that may adversely affect the lifetime or applicability of a lithium-ion battery. Additional effort has been made to improve manufacturing methods.

In a typical process for making cathode materials for lithium-ion batteries, first a so-called precursor is being formed by co-precipitating the transition metals as carbonates, oxides or preferably as hydroxides that may or may not be basic, for example oxyhydroxides. The precursor is then mixed with a source of lithium such as, but not limited to lithium compounds such as LiOH, $Li_2O$ or $Li_2CO_3$ and calcined (fired) at high temperatures. Lithium compound(s) can be employed as hydrate(s) or in dehydrated form. The calcination—or firing—often also referred to as thermal treatment or heat treatment of the precursor—is usually carried out at temperatures in the range of from 600 to 1,000° C. During the thermal treatment a solid-state reaction takes place, and the electrode active material is formed. The thermal treatment is performed in the heating zone of an oven or kiln.

A typical class of cathode active materials delivering high energy density contains a high amount of Ni (Ni-rich), for example at least 80 mol-%, referring to the content of non-lithium metals. This however results in limited cycle life due to several instability problems of the cathodes in the charged state.

Existing lithium ion batteries still have potential for improvement, especially with regard to cycling stability and capacity. Numerous theories have been developed with respect to cycling stability. It is assumed that cracking of particle agglomerates is one of the primary degradation mechanisms of cation-layered Ni-rich materials with cycling. Specifically, minimizing the large contraction of the interlayer spacing (typically >4%) when charging to high voltages is believed to be important in improving the cycling stability of such materials.

It was therefore an objective of the present invention to provide electrode active materials that undergo minimal interlayer contraction (s 1% at high voltages), and it was an objective to provide a process to make such electrode active materials.

Accordingly, the process and the materials defined at the outset have been found. Such process is hereinafter also referred to as "inventive process" or "process according to the present invention". The inventive process comprises three steps, (a), (b), and (c), in the context of the present invention also referred to as step (a) and step (b) and step (c), respectively. Step (a) and step (b) and step (c) are performed subsequently. The inventive process will be described in more detail below.

The inventive process is a process for the manufacture of composite oxides of the formula $x \cdot Li_2Ni_{1-y1-y2}Mn_{y1}M^1_{y2}O_3 \cdot (1-x) \cdot LiNi_{1-z}M^2_zO_2$ wherein the variables are defined as follows:

x is in the range of from 0.01 to 0.5, preferred are 0.1 to 0.3, z is in the range of from zero to 0.5, preferably 0.01 to 0.4 and more preferably from 0.01 to 0.1, $M^1$ is selected from Ti, Zr, Sn, Ge, Ta, Nb, Sb, W, and Mo, and combinations of at least two of the foregoing, preferred are Ti, Zr, Sn, W, Mo, and combinations of at least two of the foregoing, $M^2$ is at least one of Co, Al, Mg, Mn, or Fe, and combinations of at least two of the foregoing, preferred are Co, Al, and Mn and combinations of at least two of the foregoing, $0.1 \le y1 \le 0.75$, and $zero \le y2 \le 0.05$.

Preferably, $0.15 \le (y1+y2) \le 0.6$, more preferably, $0.3 \le (y1+y2) \le 0.55$.

From the above formula, one can conclude that the average oxidation state of Ni, Mn, $M^1$, and $M^2$ is equal to $4x+3(1-x)$.

In a preferred embodiment, $z \le 0.1$ and $M^2$ contains at least one of Co, Mn, and Al. Even more preferably, $M^2$ is Co-free.

Some elements are ubiquitous. In the context of the present invention, traces of ubiquitous metals such as sodium, calcium, iron or zinc, as impurities will not be taken into account in the description of the present invention. Traces in this context will mean amounts of 0.02 mol-% or less, referring to the total metal content of the starting material, in this case of the precursor.

The inventive process comprises the following steps:

(a) providing a particulate hydroxide, oxide or oxyhydroxide of TM where TM has the general formula $x \cdot Ni_{1-y1-y2}Mn_{y1}M^1_{y2} \cdot (1-x) \cdot Ni_{1-z}M^2_z$ or a corresponding species without Mn, $M^1$ and/or $M^2$, hereinafter also referred to as precursor.

In one embodiment of the present invention, precursors provided in step (a) are comprised of secondary particles that are agglomerates of primary particles. Preferably, precursors provided in step (a) are comprised of spherical secondary particles that are agglomerates of primary particles. Even more preferably, precursors provided in step (a) are comprised of spherical secondary particles that are agglomerates of spherical primary particles or platelets.

In one embodiment of the present invention, precursors provided in step (a) have an average particle diameter (D50) in the range of from 3 to 20 μm, preferably from 5 to 16 μm. The average particle diameter can be determined, e. g., by light scattering or LASER diffraction or electroacoustic spectroscopy. The particles are usually composed of agglomerates from primary particles, and the above particle diameter refers to the secondary particle diameter.

In one embodiment of the present invention the specific surface area (BET) of precursors is in the range of from 2 to 15 $m^2/g$, determined by nitrogen adsorption, for example in accordance with DIN-ISO 9277:2003-05.

In one embodiment of the present invention, precursors may have a particle diameter distribution span in the range of from 0.5 to 0.9, the span being defined as [(D90)−(D10)] divided by (D50), all being determined by LASER analysis. In another embodiment of the present invention, the precursor may have a particle diameter distribution span in the range of from 1.1 to 1.8.

Precursors may be obtained by coprecipitation of hydroxides of Ni, Mn, and, if applicable, $M^1$ and $M^2$, followed by drying at air.

In step (b), a source of lithium is added to the precursor and, optionally, a source of $M^1$ and/or $M^2$, in a molar ratio of Li:(Ni+Mn+$M^1$+$M^2$) of from 0.9:1 to 1.1:1.

Examples of sources of lithium are $Li_2O$, $LiNO_3$, LiOH, $Li_2O_2$, $Li_2CO_3$, each water-free or as hydrate, if applicable, for example LiOH—$H_2O$. Preferred are LiOH, $Li_2O$, and $Li_2O_2$. More preferred source of lithium is lithium hydroxide.

Examples of suitable apparatuses for performing step (b) are tumbler mixers, high-shear mixers, plough-share mixers and free fall mixers. On laboratory scale, mortars with pestles and ball mills are feasible as well.

In one embodiment of the present invention, mixing in step (b) is performed over a period of 1 minute to 10 hours, preferably 5 minutes to 1 hour.

In one embodiment of the present invention, mixing in step (b) is performed without external heating.

In one embodiment of the present invention, no dopant is added in step (b).

In a special embodiment of the present invention, in step (b) an oxide, hydroxide or oxyhydroxide of Mg, Al, Sn, Ge, Ti, Zr, Co, Mn, and Al, or a combination of at least two of the foregoing is added, preferably of Al, Ti, Zr or Ge, hereinafter also referred to as dopant.

Such dopant is selected from oxides, hydroxides and oxyhydroxides of Mg, Ti, Zr, Mo, W, Co, Mn, Nb, and Ta and especially of Al. Lithium titanate is also a possible source of titanium. Examples of dopants are $TiO_2$ selected from rutile and anatase, anatase being preferred, furthermore $TiO_2$·aq, basic titania such as $TiO(OH)_2$, furthermore $Li_4Ti_5O_{12}$, $ZrO_2$, $Zr(OH)_4$, $ZrO_2$·aq, $Li_2ZrO_3$, basic zirconia such as $ZrO(OH)_2$, furthermore MnO, $Mn_2O_3$, $Mn_3O_4$, $MnO_2$, $Mn(OH)_2$, $MoO_2$, $MoO_3$, $Fe(OH)_2$, $Fe(OH)_3$, $Fe_2O_3$, $Fe_3O_4$, $SnO_2$, $GeO_2$, $Ta_2O_5$, $Sb_2O_3$, $Sb_2O_5$, "$NbO_2$" ($Nb_2O_4$), $Nb_2O_5$, $WO_2$, $WO_3$, MgO, $Mg(OH)_2$, $Mg(NO_3)_2$, $Nb_2O_5$, furthermore $Al(OH)_3$, $Al_2O_3$, $Al_2O_3$·aq, and AlOOH. Preferred are Al compounds such as $Al(OH)_3$, α-$Al_2O_3$, γ-$Al_2O_3$, $Al_2O_3$·aq, and AlOOH. Even more preferred dopants are $Al_2O_3$ selected from α-$Al_2O_3$, γ-$Al_2O_3$, and most preferred is γ-$Al_2O_3$.

In one embodiment of the present invention such dopant may have a specific surface area (BET) in the range of from 1 to 200 $m^2/g$, preferably 50 to 150 $m^2/g$. The specific surface area (BET) may be determined by nitrogen adsorption, for example according to DIN-ISO 9277:2003-05.

In one embodiment of the present invention, such dopant is nanocrystalline. Preferably, the average crystallite diameter of the dopant is 100 nm at most, preferably 50 nm at most and even more preferably 15 nm at most. The minimum diameter may be 4 nm.

In one embodiment of the present invention, such dopant (s) is/are a particulate material(s) with an average diameter (D50) in the range of from 1 to 10 μm, preferably 2 to 4 μm. The dopant(s) is/are usually in the form of agglomerates. Its particle diameter refers to the diameter of said agglomerates.

In a preferred embodiment, dopant(s) are applied in an amount of up to 1.5 mol-% (referred to total metal content of the respective precursor), preferably 0.1 up to 0.5 mol-%.

Although it is possible to add an organic solvent, for example glycerol or glycol, or water in step (b) and perform the mixing in a ball-mill it is preferred to perform step (b) in the dry state, that is without addition of water or of an organic solvent.

A mixture is obtained from step (b). Said mixture is then treated thermally under an atmosphere comprising oxygen as follows:

(c) heating the mixture obtained from step (b) to 680 to 800° C. in an atmosphere containing oxygen, preferably to 700 to 750° C., (d) adding source of lithium, and (e) heating the mixture from step (d) to 450 to 580° C. in an atmosphere containing at least 90 vol-% oxygen, preferably 500 to 580° C., more preferably 525 to 575° C.

Step (c) may be performed once or twice.

The atmosphere in steps (c) is oxidizing, for example air or mixtures of air and a non-oxidizing gas such as nitrogen or argon, or even pure oxygen. It is preferred that the atmosphere in steps (c) is air or so-called synthetic air, a mixture from 21 vol-% oxygen and 79 vol-% nitrogen, determined at normal conditions. Even more preferred is pure oxygen.

The atmosphere of oxygen in step (e) contains at least 90 vol-% oxygen. The atmosphere of oxygen in step (e) may thus be pure oxygen or oxygen diluted with low amounts of a nonoxidizing gas, for example up to 10 vol-% of nitrogen or argon, determined at normal conditions. Even more preferably, the atmosphere in step (e) is pure oxygen.

Steps (c) and (e) may be performed in the same or in different vessel.

In one embodiment of the present invention, steps (c) (and (e) are performed in roller hearth kilns, pusher kilns or a rotary kilns or a combination of at least two of the foregoing. Rotary kilns have the advantage of a very good homogenization of the material made therein. In roller hearth kilns and in pusher kilns, different reaction conditions with respect to different steps may be set quite easily. In lab scale trials, box-type and tubular furnaces and split tube furnaces are feasible as well.

In one embodiment of the present invention, steps (c) and (e) of the present invention are performed under a forced flow of gas, for example air, oxygen and oxygen-enriched air. Such stream of gas may be termed a forced gas flow. Such stream of gas may have a specific flow rate in the range of from 0.5 to 15 $m^3/(h\cdot kg)$, resulting in inventive particulate composite oxide. The volume is determined under normal conditions: 298 Kelvin and 1 atmosphere. Said forced flow of gas is useful for removal of gaseous cleavage products such as water.

In one embodiment of the present invention, steps (c) and (e) each have a duration in the range of from two to 30 hours.

Preferred are 10 to 24 hours, more preferred are 5 to 20 hours. Any cooling time is neglected in this context.

The inventive process comprises step (d) of adding source of lithium between steps (c) and (e). It is preferred to allow the intermediate from step (c) to cool down to a maximum of 100° C. before adding source of lithium, for example to 20 to 50° C. The molar amount of $Li:(Ni+Mn+M^1+M^2)$ added in step (d) is in the range of from 0.01 to 0.6, preferred are 0.1 to 0.4 and even more preferred are 0.1 to 0.2.

The source of lithium added in step (d) is selected from the same compounds as in step (b), and it may be different or the same as in step (b). Preferred sources of lithium in step (d) are $Li_2O_2$, LiOH and $LiNO_3$, each water-free or as hydrate.

Mixing in step (d) may be performed in the same way as in strep (b), mutatis mutandis.

After thermal treatment in accordance to step (e), the electrode active material so obtained is cooled down before further processing. Additional—optional—steps before further processing the resultant electrode active materials are sieving and de-agglomeration steps.

After having performed steps (a) to step (e) of the inventive process, an electrode active material is obtained that meets the objectives as described at the outset.

In one embodiment of the present invention, a pre-calcination step is performed after step (b) and before step (c), for example at a temperature in the range of from 150 to 300° C. Said pre-calcination step may have a duration in the range of from 1 to 5 hours.

In one embodiment of the present invention, the pre-calcination step is performed under an atmosphere that contains oxygen, for example 20 to 100 vol-%, preferably of from 60 to 95 vol-%, determined at ambient temperature.

In one embodiment of the present invention, the inventive process comprises an additional step (f) subsequent to step (e), and wherein said step (f) is selected from coating steps and wet treatment steps.

Another aspect of the present invention is related to electrode active materials, hereinafter also referred to as inventive electrode active materials or as inventive cathode active materials.

The inventive electrode active materials are composite oxides of the formula

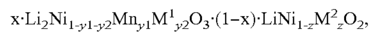

$$x\cdot Li_2Ni_{1-y1-y2}Mn_{y1}M^1_{y2}O_3\cdot(1-x)\cdot LiNi_{1-z}M^2_zO_2,$$

wherein the variables are defined as follows:

- x is in the range of from 0.01 to 0.5, preferred are 0.1 to 0.3,
- z is in the range of from zero to 0.5, preferably 0.01 to 0.4 and more preferably from 0.01 to 0.1,
- $M^1$ is selected from Ti, Zr, Sn, Ge, Ta, Nb, Sb, W, and Mo, and combinations of at least two of the foregoing, preferred are Ti, Zr, Sn, W, and Mo, and combinations of at least two of the foregoing.
- $M^2$ is at least one of Na, K, Co, Al, Mg, Fe, or Mn, and combinations of at least two of the foregoing, preferred are Co, Al, Mg, Fe, or Mn, and combinations of at least two of the foregoing, and more preferred are Co, Al, and Mn and combinations of at least two of the foregoing, $$0.15\leq y1\leq 0.75,\ \text{zero}\leq y2\leq 0.05.$$

Preferably, $0.15\leq(y1+y2)\leq 0.6$, more preferably, $0.3\leq(y1+y2)\leq 0.55$.

From the above formula, one can conclude that the average oxidation state of $M^1$ is +4, and the average oxidation state of $M^2$ is +3.

In a preferred embodiment, z≤0.1 and $M^2$ contains at least one of Co, Mn, and Al. Even more preferably, $M^2$ is Co-free. In the context of the present invention, "Co-free" means that the Co-content of $M^2$ is 0.5 mol-% or less.

In one embodiment of inventive electrode active materials, domains may be observed, e.g., by transmission electron microscopy ("TEM") or high-resolution transmission electron microscopy. In such domains, preferably cations in both the $Li_2Ni_{1-y1-y2}Mn_{y1}M^1_{y2}O_3$ domains and the $LiNi_{1-z}M^2_zO_2$ domains exhibit a substantially layered ordering, where the $Li_2Ni_{1-y1-y2}Mn_{y1}M^1_{y2}O_3$ domains display alternating Li and $L_{1/3}[Ni_{1-y1-y2}Mn_{y1}M^1_{y2}]_{2/3}$ cation layers, and the $LiNi_{1-z}M^2_zO_2$ domains display alternating $Ni/M^2$ and Li cation layers. The $Li_{1/3}[Ni_{1-y1-y2}Mn_{y1}M^1_{y2}]_{2/3}$ cation layers in the $Li_2Ni_{1-y1-y2}Mn_{y1}M^1_{y2}O_3$ domains exhibit a substantially honeycomb-type cation ordering where each Li cation has no further Li cations as nearest cation neighbors within the same cation layer, as determined by the presence of in-plane superstructure peaks in the X-ray diffractogram.

Some elements are ubiquitous. In the context of the present invention, traces of ubiquitous metals such as sodium, calcium, iron or zinc, as impurities will not be taken into account in the description of the present invention. Traces in this context will mean amounts of 0.02 mol-% or less, referring to the total metal content of the starting material, in this case of the precursor.

Inventive electrode active materials are in particulate form. In one embodiment of the present invention, the mean particle diameter (D50) of inventive electrode active materials is in the range of from 2 to 15 μm, preferably 5 to 10 μm. The mean particle diameter (D50) in the context of the present invention refers to the median of the volume-based particle diameter, as can be determined, for example, by light scattering, and it refers to the secondary particle diameter.

In one embodiment of the present invention the specific surface area (BET) of inventive electrode active materials is in the range of from 0.1 to 1.5 $m^2/g$, determined by nitrogen adsorption, for example in accordance with DIN-ISO 9277:2003-05.

In one embodiment of the present invention, inventive electrode active materials have a particle diameter distribution span in the range of from 0.5 to 0.9, the span being defined as [(D90)−(D10)] divided by (D50), all being determined by LASER analysis. In another embodiment of the present invention, inventive electrode active materials may have a particle diameter distribution span in the range of from 1.1 to 1.8.

In one embodiment of the present invention, inventive electrode active materials have a high pressed density may be obtained, for example 2.9 to 3.7 $g/cm^3$ at a pressure of 250 MPa.

In one embodiment of the present invention, inventive electrode active materials contain a measurable quantity of $Ni^{4+}$ cations in the lithiated state, as determined by the presence of an absorption peak at 855 eV at the Ni L3 edge.

A further aspect of the present invention refers to electrodes comprising at least one electrode material active according to the present invention. They are particularly useful for lithium ion batteries. Lithium ion batteries comprising at least one electrode according to the present invention exhibit a good discharge behavior. Electrodes comprising at least one electrode active material according to the present invention are hereinafter also referred to as inventive cathodes or cathodes according to the present invention.

Specifically, inventive cathodes contain (A) at least one inventive electrode active material, (B) carbon in electrically conductive form, (C) a binder material, also referred to as binders or binders (C), and, preferably, (D) a current collector.

In a preferred embodiment, inventive cathodes contain (A) 80 to 98% by weight inventive electrode active material, (B) 1 to 17% by weight of carbon, (C) 1 to 15% by weight of binder material, percentages referring to the sum of (A), (B) and (C).

Cathodes according to the present invention can comprise further components. They can comprise a current collector, such as, but not limited to, an aluminum foil. They can further comprise conductive carbon and a binder.

Cathodes according to the present invention contain carbon in electrically conductive modification, in brief also referred to as carbon (B). Carbon (B) can be selected from soot, active carbon, carbon nanotubes, graphene, and graphite, and from combinations of at least two of the foregoing.

Suitable binders (C) are preferably selected from organic (co)polymers. Suitable (co)polymers, i.e. homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (C) is polybutadiene.

Other suitable binders (C) are selected from polyethylene oxide (PEO), cellulose, carboxymethylcellulose, polyimides and polyvinyl alcohol.

In one embodiment of the present invention, binder (C) is selected from those (co)polymers which have an average molecular weight $M_w$ in the range from 50,000 to 1,000,000 g/mol, preferably to 500,000 g/mol.

Binders (C) may be cross-linked or non-cross-linked (co)polymers.

In a particularly preferred embodiment of the present invention, binder (C) is selected from halogenated (co) polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to electrode active material. In other embodiments, inventive cathodes may comprise 0.1 up to less than 1% by weight of binder(s).

A further aspect of the present invention is a battery, containing at least one cathode comprising inventive electrode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds according to the general formulae (II) and (III)

(II)

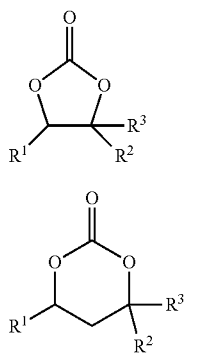

(III)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tertbutyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

(IV)

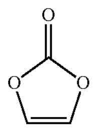

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur, t=2, when Y is selected from among nitrogen and phosphorus, and t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good discharge behavior, for example at low temperatures (zero ° C. or below, for example down to −10° C. or even less), a very good discharge and cycling behavior.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by the following working examples.

General: $Li_2O_2$ (90% purity), and $LiOH—H_2O$ were purchased from Sigma Aldrich rpm: revolutions per minute

EXAMPLE 1: MANUFACTURE OF INVENTIVE CAM.1

Example 1 describes the synthesis of Li-excess $x \cdot Li_2Ni_{1-y1-y2}Mn_{y1}M^1_{y2}O_3 \cdot (1-x) \cdot LiNi_{1-z}M^2_zO_2$ where x=0.22, y1=0.45, and y2=z=0 (equivalently, $0.22 \cdot Li_2Ni_{0.55}Mn_{0.45}O_3 \cdot 0.78 \cdot LiNiO_2$, $Li_{1.1}[Ni_{0.9}Mn_{0.1}]_{0.9}O_2$, or $Li_{1.1}Ni_{0.81}Mn_{0.09}O_2$, hereafter CAM.1)

Step (a.1): A spherical $Ni_{0.9}Mn_{0.1}(OH)_2$ precursor was obtained by combining aqueous nickel and manganese sulfate solution (1.65 mol/kg solution) with an aqueous 25 wt. % NaOH solution and using ammonia as complexation agent. The pH value was set at 12.6. The freshly precipitated $Ni(OH)_2$ was washed with water, sieved and dried at 120° C. for 12 hours. P-CAM.1 was obtained. Average particle diameter (D50): 10 μm.

Step (b.1) An amount of 5.0 g P-CAM.1 and 2.383 g $LiOH \cdot H_2O$ (molar ratio of transition metals to lithium 1:1) were mixed and milled without solvent for 1 hour at 300 rpm in a planetary ball mill. A mixture was obtained.

Step (c.1): The mixture from step (b.1) was heated to 200° C. for 2 hours in a 100% oxygen atmosphere with a temperature ramp rate of 3° C./min in a tube furnace and then cooled to ambient temperature. After re-grounding the mixture was calcined at 700° C. for 24 hours in a 100% $O_2$ atmosphere and then allowed to cool to room temperature naturally.

Step (d.1): The material produced in step (c.1) was mixed with $Li_2O_2$ by mixing with mortar and pestle, 0.25 g of the intermediate from step (c.1) and 0.0145 g $Li_2O_2$.

Step (e.1) The resultant mixture was then heated to 550° C. for 20 hours in a 100% $O_2$ atmosphere with a temperature ramp rate of 3° C./min in a tube furnace, followed by natural cooling to room temperature. CAM.1 was obtained.

COMPARATIVE EXAMPLE 2: MANUFACTURE OF C-CAM.2

The same procedure as in Example 1 was conducted with the exception that steps (d.1) and (e.1) were omitted, to produce a stoichiometric layered material with $Li_{1.0}Ni_{0.9}Mn_{0.1}O_2$ composition, C-CAM.2.

EXAMPLE 3: MANUFACTURE OF INVENTIVE CATHODE ACTIVE MATERIAL CAM.3

Step (b.3) An amount of 3.0 g P-CAM.1 and 1.752 g $LiOH \cdot H_2O$ (molar ratio of transition metals to lithium 1:1) were mixed and milled without solvent for 5 minutes at 8,000 rpm using tube milling. A mixture was obtained.

Step (c.3): The mixture from step (b.3) was heated to 500° C. for 10 hours in a 100% oxygen atmosphere with a temperature ramp rate of 3° C./min in a tube furnace, and then to 750° C. for 15 hours in a 100% $O_2$ atmosphere and then allowed to cool to room temperature naturally.

Step (d.3): The material produced in step (c.3) was mixed with $LiOH \cdot H_2O$ by mixing with mortar and pestle, 0.5 g of the intermediate from step (c.3) and 0.0239 g $LiOH \cdot H_2O$. The overall molar ratio of Li to transition metal was 1.1:0.9.

Step (e.3) The resultant mixture was then heated to 570° C. for 15 hours in a 100% $O_2$ atmosphere with a temperature ramp rate of 3° C./min in a tube furnace, followed by natural cooling to room temperature. CAM.3 was obtained.

Evaluation of the Cathode Active Materials:

Cathode Active Material Characteristics: XRD patterns of CAM.1 and C-CAM.2 were recorded with Mo Kα radiation between 5° and 45°.

Battery Characteristics: Electrochemical performances were evaluated with CR2032 coin cells between 2.5-4.8 V and 2.5-4.3 V. The cathodes were prepared by mixing 80 wt. % active materials with 10 wt. % carbon black and 10 wt. % PVDF binder, casting the mixture into thin sheets of about 150 μm thick on Al foil using a doctor blade. The coin cells were assembled with the thus fabricated cathodes, lithium foil anode, 1 M $LiPF_6$ in ethylene carbonate/diethyl carbonate (EC/DEC) electrolyte, and Celgard polypropylene separator.

BRIEF EXPLANATION OF THE DRAWINGS

FIG. 1A is a plot of the XRD patterns of CAM.1 and of C-CAM.2.

FIG. 1B is an enhanced view of the plot of the XRD patterns of CAM.1 and of C-CAM.2. Both CAM.1 and C-CAM.2 have the typical O3 layered structure (space group: R-3m with Bragg peaks). In FIG. 1B, CAM.1 has superstructure reflections observed around 2θ=1 0-15° corresponding to the ordering of the transition metal ions and Li ions in the transition metal layer of the layered lattice. The excess Li does not significantly change the main reflections except for the superstructure reflections, indicating that CAM.1 maintains the 03 layered structure with excess Li in transition metal layer in bulk structure. The superstructure reflections indicate the honeycomb ordering of the Li with respect to the Ni/Mn in the $Li_2Ni_{0.55}Mn_{0.45}O_3$ domains.

FIGS. 2(A)-2(D) are a series of plots showing the first charge-discharge voltage curves and dQ/dV curves at first cycle of the C-CAM.2 (FIGS. 2A and 2B, respectively) and the first charge-discharge voltage curves and dQ/dV curves at first cycle of the CAM.1 (FIGS. 2C and 2D, respectively) at a 10 mA/g rate in the 4.3-2.5V voltage window. In this voltage window sample C-CAM.2 shows a reversible capacity of ~215 mAh/g at first cycle, while CAM.1 shows a smaller reversible capacity of ~185 mAh/g in the first cycle. sample-CAM.2 exhibits a strong plateau around 4.2V in the charge profile, which has been mainly attributed to H2-H3 phase transition. The H2-H3 phase transition around 4.2V is accompanied by a strong discontinuous shrinkage of the c lattice parameter with volume change, eventually leading to fatigue and mechanical degradation. Compared to sample CAM.2, CAM.1 exhibits a weak plateau this 4.2V plateau.

FIGS. 3A to 3D are a series of plots showing the first charge-discharge voltage curves and dQ/dV curves of the C-CAM.2 (FIGS. 3A and 3B, respectively) and the first charge-discharge voltage curves and dQ/dV curves of the CAM.1 (FIGS. 3C and 3D, respectively) at 10 mA/g rate in 4.8-2.5V voltage window. sample-CAM.2 shows a reversible capacity of ~250 mAh/g in the first cycle, which is similar to the theoretical capacity (~275 mAh/g) from Ni redox. Also the voltage profile of C-CAM.2 is almost similar with the voltage profile in 4.3-2.5V without any additional plateau. CAM.1, however, exhibits a plateau around 4.5V in the first charge profile, which has been mainly attributed to a combination of reversible oxygen oxidation and irreversible loss of oxygen from the layered lattice, both of which are enabled by—and indicative of—the presence of the $Li_2Ni_{0.55}Mn_{0.45}O_3$ domains. It also seen FIG. 3C that the Li-excess sample shows higher reversible capacity ~230 mAh/g at first cycle than the theoretical capacity from Ni redox reaction (~200 mAh/g), which can be attributed to the reversible oxygen redox reaction. Without wishing to be bound by any theory, the difference between the charge and discharge capacity can be attributed to irreversible oxidation reactions, likely involving oxygen gas release from the material. CAM.1 can thus be cycled in a lower voltage window, achieving lower capacity but no oxygen gas release, or to higher voltage (>4.3 V) achieving higher capacity but potentially suffering from oxygen gas release. In both cases, the H2-H3 phase transition and interlayer contraction are mitigated.

FIGS. 4A and 4B are plots showing the cycling performance (in voltage versus capacity) of CAM.1 and C-CAM.2 between 4.8-2.5V at 10 mA/g for 20 cycles, respectively. C-CAM.2 (FIG. 4B) shows a capacity retention of 88.1% in 20 cycles. In contrast, CAM.1 (FIG. 4A) exhibits the improved capacity retention (93.5%) in the first 20 cycles. Without wishing to be bound by any theory, the better cyclability of CAM.1 can be due to the suppression of the H2-H3 phase transition.

The invention claimed is:

1. Process for making a cobalt-free composite oxide according to the formula $x \cdot Li_2Ni_{1-y}Mn_yO_3 \cdot (1-x) \cdot LiNiO_2$ wherein x is in the range of from 0.1 to 0.5, $0.1 \leq y \leq 0.75$, said process comprising the following steps:

(a) providing a particulate hydroxide, oxide or oxyhydroxide of TM where TM has the general formula $x \cdot Ni_{1-y}Mn_y \cdot (1-x)$ Ni, (b) adding a source of lithium and, optionally, at least one oxide, hydroxide, or oxyhydroxide of Mn, in a molar ratio of Li:(Ni+Mn) of from 0.9:1 to 1.1:1, (c) heating the mixture obtained from step (b) to 680 to 800° C. in an atmosphere containing oxygen, (d) adding source of lithium, and (e) heating the mixture obtained from step (d) to 450 to 580° C. in an atmosphere containing at least 90 vol-% oxygen.

2. Process according to claim 1 wherein $0.15 \leq y \leq 0.6$.

3. Process according to claim 1 wherein steps (c) (and (e) are performed under a forced flow of gas.

4. Process according to claim 1 wherein the source of lithium is selected from lithium hydroxide, lithium carbonate, lithium nitrate, and lithium oxide.

5. Process according to claim 1 wherein x is in the range of from 0.1 to 0.3.

6. Process according to claim 1 wherein said process comprises an additional step (f) subsequent to step (e), and wherein said step (f) is selected from coating steps and wet treatment steps.

7. Particulate cobalt-free composite oxide of the composition $x \cdot Li_2Ni_{1-y}Mn_yO_3 \cdot (1-x) \cdot LiNiO_2$ wherein x is in the range of from 0.01 to 0.5, $0.1 \leq y \leq 0.75$.

8. Particulate composite oxide according to claim 7 wherein $0.15 \leq y \leq 0.6$.

9. Particulate composite oxide according to claim 7 wherein x is in the range of from 0.1 to 0.3.

10. Particulate composite oxide according to claim 7 wherein cations in both the $Li_2Ni_{1-y}Mn_yO_3$ and the $LiNiO_2$ domains exhibit a substantially layered ordering, where the $Li_2Ni_{1-y}Mn_yO_3$ domains display alternating Li and $Li_{1/3}[Ni_{1-y}Mn_y]_{2/3}$ cation layers, and the $LiNiO_2$ domains display alternating Ni and Li cation layers, and wherein $Li_{1/3}[Ni_{1-y}Mn_y]_{2/3}$ cation layers in the $Li_2Ni_{1-y}Mn_yO_3$ domains exhibit substantially a honeycomb-type cation ordering wherein the Li cations have no other Li cations as their nearest cation neighbors within the same cation layer.

11. Cathode comprising (A) at least one particulate composite oxide according to claim 7, (B) carbon in electrically conductive form, (C) at least one binder.

12. Electrochemical cell comprising a cathode according to claim 11.

* * * * *